United States Patent [19]

Nakazato et al.

[11] Patent Number: 5,218,295

[45] Date of Patent: Jun. 8, 1993

[54] SYSTEM FOR PROCESSING POSITION SIGNALS TO IMPROVE RESOLUTION OF THE POSITION OF AN OBJECT

[75] Inventors: Masakazu Nakazato; Yoshitsugu Tsuchiya; Kazuhisa Ikenoya; Yoichi Shimoura, all of Sagamihara, Japan

[73] Assignee: Kayaba Kogyo Kabushiki Kaisha, Tokyo, Japan

[21] Appl. No.: 685,806

[22] Filed: Apr. 15, 1991

[51] Int. Cl.$^5$ .............................................. G01B 7/14
[52] U.S. Cl. ........................... 324/207.24; 340/870.35; 324/227
[58] Field of Search ....................... 324/207.15, 207.16, 324/207.18, 207.19, 207.25, 232, 227, 173, 174, 166, 165; 340/870.31, 870.35, 870.32, 870.33, 672, 686; 310/155, 168

[56] References Cited

U.S. PATENT DOCUMENTS

| | | | |
|---|---|---|---|
| 4,743,786 | 5/1988 | Ichikawa et al. | 324/207.25 X |
| 4,785,242 | 11/1988 | Vaidya et al. | 324/207.25 |
| 4,833,405 | 5/1989 | Richards et al. | 324/207.25 X |

*Primary Examiner*—Gerard R. Strecker
*Assistant Examiner*—W. S. Edmonds
*Attorney, Agent, or Firm*—Jordan and Hamburg

[57] ABSTRACT

System for processing fine position signals pulse-width modulates signals from two magnetic sensors for producing sinusoidal wave signals different from each other in phase by a quarter cycle in correspondence with the scale pitches, then switches the phase so as to bring the pair of pulse-modulated signals in phase with each other, then calculates the weight constants for the pair of pulse-width modulated signals in phase in order that of said pair of pulse-width modulated signals in phase, any one having a higher linearity will be treated at a handsome rate, and then subjects said pulse-width modulated signals to weighted mean by the use of the resultant weight constants, with the result that the pair of pulse-width modulated signals will become free from disorder at the switching point, thereby producing signals of a high accuracy representing fine positions corresponding to the scale pitch divided at regular intervals.

4 Claims, 6 Drawing Sheets

SYSTEM FOR PROCESSING POSITION SIGNALS TO IMPROVE RESOLUTION OF THE POSITION OF AN OBJECT

BACKGROUND OF THE INVENTION

The present invention relates to a system for processing pulse-width modulated signals representing detected position, and which system is capable of detection with a high resolution of positions by finely dividing the signals representing detected position.

With a system for detecting the stroke position of a piston rod of a hydraulic cylinder, comprising magnetic scales each positioned axially at regular intervals and embedded in the surface of the piston rod and a pair of magnetic sensors mounted on the cylinder with 90 degrees phase shift therebetween, for example, the detection of stroke position consists of procedure steps of fetching outputs of the magnetic sensors varying with the movement of the piston rod, converting the outputs into pulse signals, and counting the number of the pulses. In this case, the signals of the magnetic sensors are sinusoidal wave signals, and if an arrangement is made such that these sinusoidal wave signals may generate pulse signals when they cross a zero point, positional detection may be achieved by the two sinusoidal wave signals which are out of phase with one another, having a resolution based on a quarter division of one pitch of the magnetic scale.

Japan Patent application No. 62-99203 describes further sub-division of each of the pitches of the magnetic scales for improvement of positional detection in accuracy.

In this invention, use is made of a sinusoidal wave having a frequency (e.g. 100 times) higher than that of a sinusoidal wave signal of a magnetic sensor so as to pulse-width modulate magnetic sensor signals, and subsequent counting of the pulse-width modulated signals makes it possible to carry out the detection of a position finely divided at a rate at which the pitch of the magnetic scale has been divided at regular intervals in correspondence with the frequency of a high frequency signal.

In this case, if the magnetic sensor signals are not shaped like a sinusoidal wave, but a highly linear one such as a triangular wave signal, the pitch can be divided at regular intervals to ensure the detection with a high degree of accuracy of a finely divided position, but since the signals of the magnetic sensor will in fact closely approximate to a sinusoidal wave, no division at uniform intervals may be achieved. It has been found, however, that use of a sinusoidal wave identical to a magnetic sensor signal as a pulsed-width modulating signal may cause improvement of the linearity during the pulse-width modulation.

However, due to the fact that the magnetic sensor signal in the form of a sinusoidal wave signal represents a high linearity in the vicinity of the zero point they will pass, but the curvature is small, and varies abruptly near the peak value of the signal, even the use of a high frequency sinusoidal wave signal as a modulating signal will result in a failure of linearity near the peak value, thereby causing a division at irregular intervals in association with unavoidable error in the detection of fine positions.

Japan Patent Application No. 63-98564 proposed the realization of the detection of fine positions correspondingly based on pitches divided at uniform intervals by procedure steps of dividing one cycle of each of two magnetic sensors into four quarter cycle sections, selecting a signal for a higher linear portion in each sections, and combining these selected signals into position signals.

In this instance, though the division of high accuracy can be achieved in each quarter cycle, when a section with a high linearity signal is switched to its next section, the signal tends to become discrete at a switching point, or to change its inclination, thereby impairing the linearity. This is caused by the fact that the center portions of amplitude of the magnetic sensor signal and modulating signal may shift when these signals are composed during the pulse-width modulation mode, or that the output property of the magnetic sensor signal may vary for each scale pitch due to any production fault of a magnetic scale.

This has resulted in variation of the divisional interval at a signal switching point with the consequential obtainment of no uniform resolution.

Thus, the object of the present invention is to provide a system for processing signals representing detected positions wherein a stable high resolution with an improved accuracy may be obtained in each of the scale pitches.

SUMMARY OF THE INVENTION

In accordance with the present invention, a pair of sensor signals from a first and second magnetic sensors operable to produce sinusoidal wave signals each having phase difference by a quarter cycle with respect to each other in correspondence with each scale pitch are pulse-width modulated using high frequency sinusoidal waves as a modulating signal. The pair of pulse-width modulated signals are so processed as to be in phase. The weight constants for the two pulse-width modulated signals in phase is calculated in order that, of these pulse-width modulated in phase, any one having a high linearity will be treated at an enhanced rate. If said pair of pulse-width modulated signals in phase are subjected to a weighted mean by the use of the weight constants, the pulse-width modulated signals in phase with each other will not fall into disorder to insure that signals of high accuracy representing fine positions based on the scale pitches divided at uniform intervals.

The system preferably comprises means for dividing one cycle of said first magnetic sensor signal into four quarter cycle sections, means for inverting a second quarter cycle signal counting from the top of said four sections, means for selecting said inverted second quarter cycle signal and a top quarter cycle signal of the four quarter cycle sections, means for dividing one cycle of said second magnetic sensor signal into two half cycle sections, means for selecting the former half cycle, and means for pulse-width modulating said first magnetic sensor signals and the selected signal of said second magnetic sensor by the high frequency sinusoidal wave signals.

Addition is preferably made of a phase switching means for bringing the former half cycle signal of said magnetic sensor and pulse-width modulated signal in phase with one another by shifting down the pulse-width modulated first quarter cycle signal of said first magnetic sensor by a duty ratio of 0.5, and shifting up the pulse-width modulated second reversed quarter cycle signal by a duty ratio of 0.5.

Furthermore, it should be preferable that the system also includes means for calculating weight constants in order that firstly the pulse-width modulated former half cycle signal of said second magnetic sensor is treated at an enhanced rate in the vicinity of a quarter pitch of said scale pitches, and secondly the pulse-width modulated signal of said first magnetic sensor is treated at an enhanced rate in the vicinity of a zero pitch and a half pitch of said scale pitches.

DETAILED DESCRIPTION OF THE PREFERRED EMBODIMENT

Figure 1:
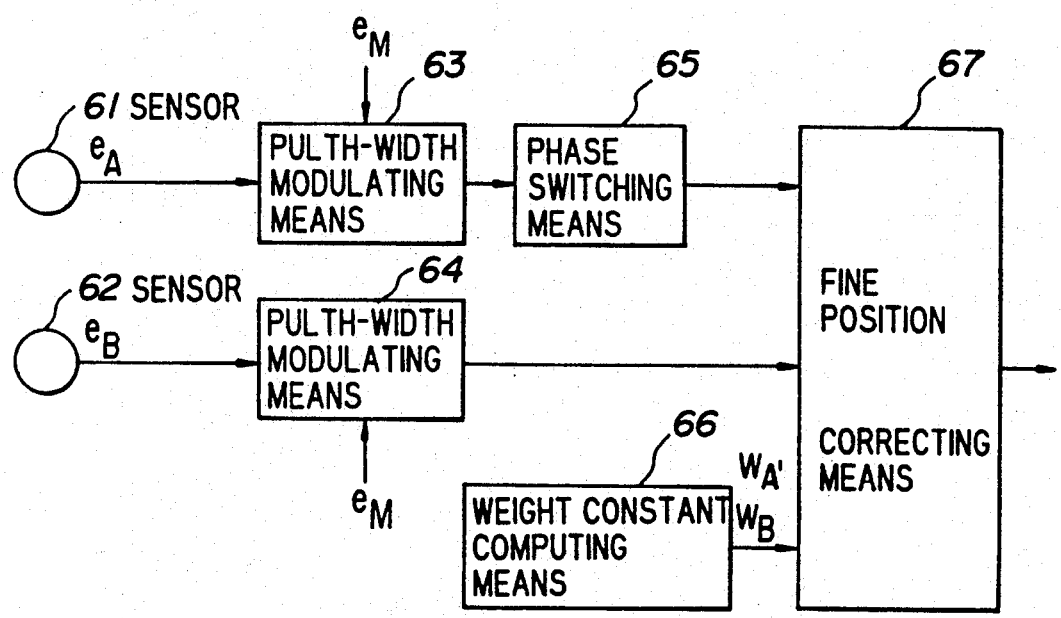
FIG. 1 is a block diagram showing the structure of the present invention.

FIG. 1 schemtaically shows the structure of the present invention.

A cylinder is provided with first and second magnetic sensors 61, 62 for sinusoidal wave signals $e_A$, $e_B$ which are different in phase by a quarter cycle in correspondence with the pitches of a magnetic scale disposed axially at equal spaces on a piston rod. Signals from said pair of magnetic sensors 61, 62 are pulse-width modulated by pulse-width modulation means 63, 64 into modulated signals of high frequency sinusoidal waves. The phase from the pulse-width modulating means 63 is switched for correction by a switching means 65 so that the pair of pulse-width modulated signals will be in phase with one another. There are provided means 66 for calculating weight constants WA', WB for the pair of pulse-width modulated signals in order that, of the pair of pulse-width modulated signals in phase, any one having a higher linearity will be treated at an enhanced rate. In conjunction with these resultant weight constants WA', WB, the signals representing finely divided positions in the scale pitches are calculated by subjecting said pair of pulse-width modulated signals to a weighted mean by a correction means 67. Consequently, since the pulse-width modulated signal having a higher linearity of the pair of pulse-width modulated signals are treated at an enhanced rate, any signal near the peak value and having a defective linearity of the pair of pulse-width modulated signals receives almost no treatment, and the pair of pulse-width modulated signals in phase are subjected to weighted mean in correspondence with the linearity, so that signals representing fine positions which are not discrete on the changing point but divided at regular intervals may be gained.

More detailed description will next be made with reference to FIG. 2.

Figure 2:
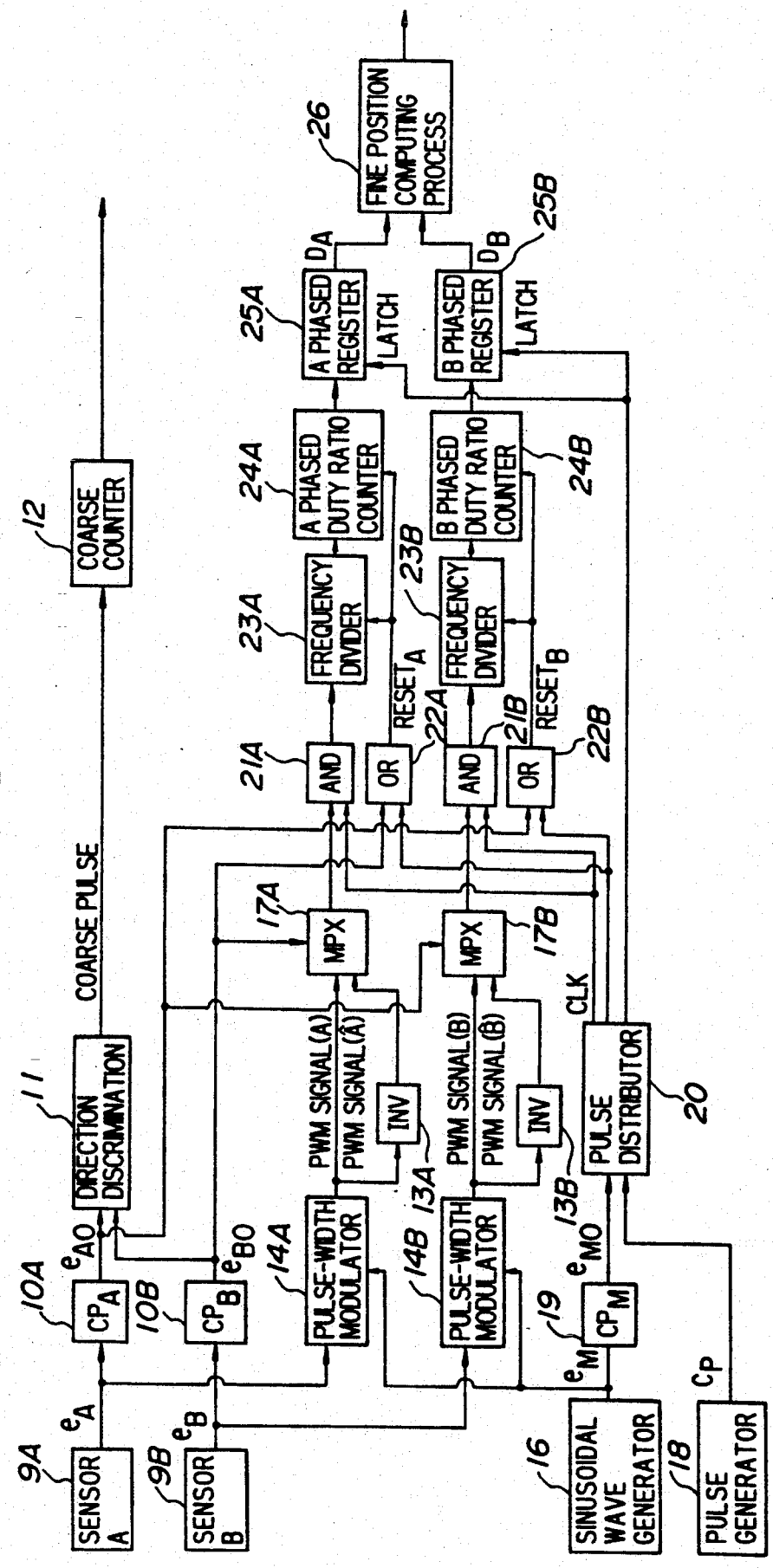
FIG. 2 is a block diagram illustrating an embodiment of the present invention in detail.
Figure 3:
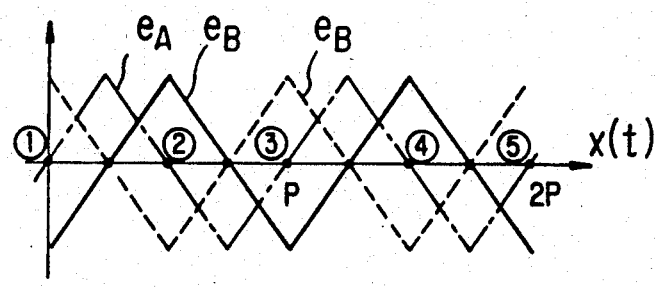
FIG. 3 is a view showing waveforms of a magnetic sensor signal.

Referring to FIG. 2, 9A, 9B designate a pair of magnetic sensors which are provided spaced apart mutually by a quarter pitch of one graduation with respect to a magnetic scale (not shown), these sensors 9A, 9B acting to supply sensor signals $e_A$, $e_B$. In the following description, $e_A$ may be referred to as A phased signal, and $e_B$ as B phased signal. The sinusoidal wave of a sensor signal is symbolized as a triangular wave for convenience sake in FIG. 3.

As regards the detection of coarse position, the sensor signals $e_A$, $e_B$ are subjected to wave-shaping by comparators 10A, 10B into square wave signals $e_{AO}$, $e_{BO}$, which then will be fed to a direction discrimination circuit 11, to obtain coarse pulses (corresponding to the coarse position). By counting the coarse pulses by means of a coarse counter 12, the counted values will correspond with zero-crossing points (1, 2, 3 in FIG. 3) of an A phased signal $e_A$, i.e. the coarse position. P is identified as a scale pitch. Since the coarse pulses produced in the direction discrimination circuit 11 are generated only when the square wave signal $e_{AO}$ rises or falls, the coarse position corresponds to a half pitch P.

On the other hand, in order to find a fine position (finely divided position between the sensors), the two sensor signals $e_A$, $e_B$ are pulse-width modulated by a high frequency modulating signal $e_M$ from a sinusoidal wave generator 16 in corresponding pulse-width modulators 14A, 14B to obtain a pair of PWM signals (A), (B).

Figure 4:
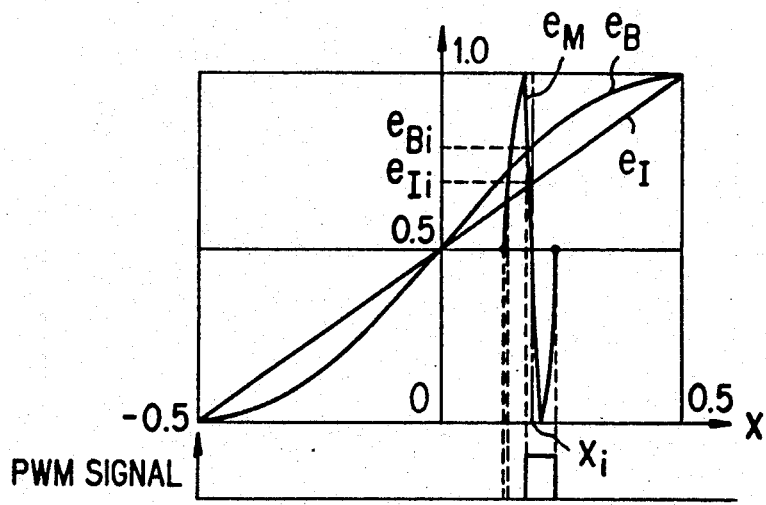
FIG. 4 is a view showing waveforms resulting from the composition of a sensor signal and a pulse-width modulating signal for the purpose of explaining the principle of a high resolution.

The sinusoidal wave is employed as pulse-width modulating signal $e_M$ because it is theoretically substantiated that sensor signals $e_A$, $e_B$ are among the sinusoidal waves, and so if they are employed as modulating signals of the same sinusoidal waves, the duty ratio resulting from the pulse-width modulation (the rate of a high level time relative to one cycle of $e_M$) agrees approximately (completely to the interpolation straight line in the ideal state where the frequency of $e_M$ is infinity) to the value (e.g. $e_{Ii}$) of an interpolation straight line $e_I$ as shown in FIG. 4.

In the expectation that one cycle of each of the sensor signals $e_A$, $e_B$ will be divided into two half cycle sections, signals (PWM signal (Â), PWM signal (B̂)) resulting from the inversion by inverters 13A, 13B of PWM signals (A), (B) will have to be prepared. PWM signals (Â), (B̂) are the resultant of the inversion of PWM signals (A), (B).

Within multiplexers 17A, 17B, one PWM signal is selected from among the four PWM signals (A), (Â), (B), (B̂), as shown in the following table by the use of square wave signals $e_A$, $e_B$ in opposite phase. The selected PWM signal is generally called "selected PWM signal".

| Square signals | Selected PWM signals |
| --- | --- |
| Rise of $e_{BO}$ | PWM signal (Â) |
| Fall of $e_{BO}$ | PWM signal (A) |
| Rise of $e_{AO}$ | PWM signal (B) |
| Fall of $e_{AO}$ | PWM signal (B̂) |

Next a count pulse CLK is used to convert the duty ratio of the selected PWM signal into a count value. This conversion is effected by, while placing count pulse CLK passing through AND circuits 21A, 21B under the control of the selected PWM signal as a gate signal, counting the passed count pulse CLK by means of duty ratio counters 24A, 24B. The resolution of the duty ratio is established by frequency dividers 23A, 23B located before the duty ratio counters 24A, 24B.

Then, for each cycle of the modulating signal $e_M$, the duty ratio count values (thereafter simply referred to as "duty ratio") $D_A$, $D_B$ are latched in registers 25A, 25B. Clock pulses $C_P$ which are the first to appear after the rise of square wave signals $e_{M0}$ resulting from the wave-shaping by the comparator 19 of modulating signals $e_M$ are picked to be used as a latch signal LATCH. Now that it is necessary to reset the frequency dividers 23A, 23B prior to the duty ratio counting, reset signals RESET(A), RESET(B) are obtained by passing through OR circuits 22A, 22B clock pulses $Cl_P$ following the latch signals LATCH and rise and fall pulses of square wave signals $e_{A0}$, $e_{B0}$ in 180 degrees out-of-phase.

Figure 5:
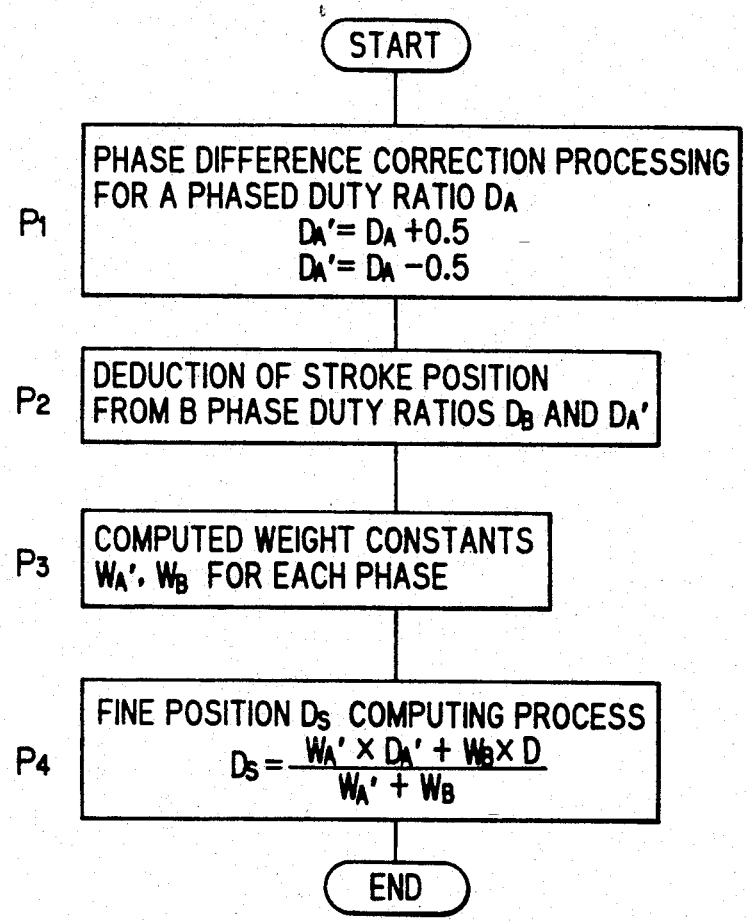
FIG. 5 is a flow chart showing a control operation implemented by a computer for correction of a signal representing highly divided positions.

26 identifies a fine position computing/processing circuit constituted by a microcomputer for finding the fine position by fetching a pair of duty ratios $D_A$, $D_B$, and performing an operation as shown in FIG. 5.

Figure 6:
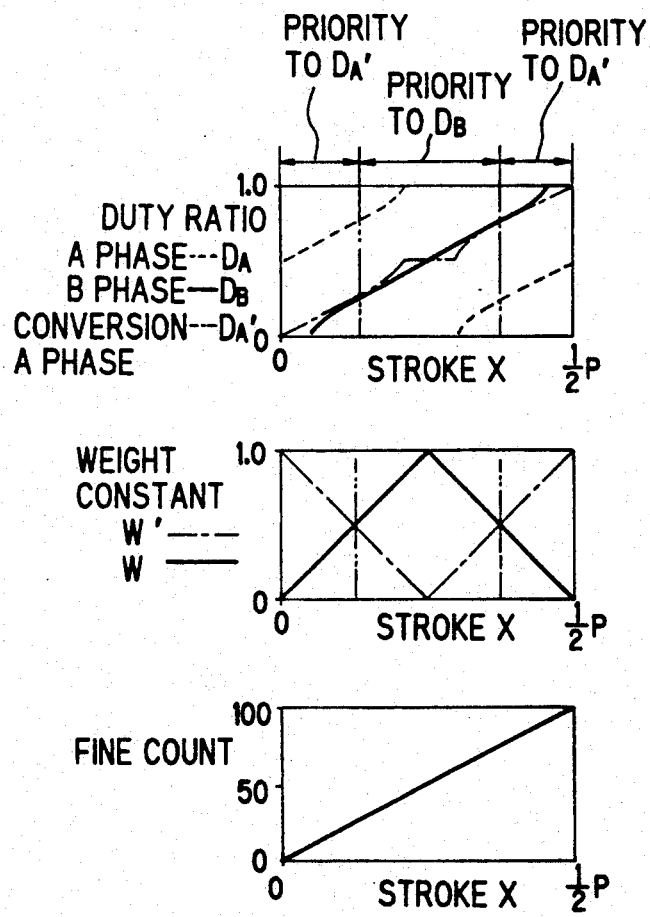
FIG. 6 illustrates waveforms for explanation of the weighted correction of the signal representing highly divided positions, and, FIGS. 7(A) and (B) are views showing waveforms resultant from the correction of the signal representing highly divided positions.

Before description of said operation, the principle of the positional detection will be described by way of an example of the case in which the sensor signal is inconsistent with the modulating signal in amplitude (when the amplitude of the sensor signal, the amplitude of the modulating signal). FIG. 6 shows the variation properties of $D_A$, $D_B$ in this case in the upper stage. In this instance, since either sensor signals $e_A$, $e_B$ perform pulse-width modulation, two duty ratios which are different from each other by 90 degrees out-of-phase (corresponding to a duty ratio of 0.5) with respect to one stroke position can be achieved. In this drawing, the range of the stroke X is indicated as (¼) P, where P; scale pitch on grounds that since the variation properties of the duty ratio are repeated for each (½) P in this case, consideration with reference to a minimum unit of (½) P will do.

Now, firstly, consideration is taken of an attempt to bring $D_A$ as shown by a broken line and $D_B$ as shown by a solid line in phase. That is, if when $0 \leq X < $ (¼) P, $D_A$ is shifted down by 0.5, and when (¼) $P \leq X < $ (½) p, $D_A$ is shifted up by 0.5, a straight line $D_A'$ running one the same positions as in $D_B$ will be obtained.

Referring to $D_A'$ as shown by a long and short dash line, when the stroke X is located near OP or (½) P, a good linearity will be obtained, but not near (¼) P. According to $D_B$ as shown by the solid line, on the contrary, the linearity is found to be good near (¼) P, but disordered near OP or (½) P.

This shows that $D_A$ plus OP or (½) P may be treated at an enhanced rate because $D_A$ is good in linearity near OP or (½) P, and that on the other hand, $D_B$ plus (¼) P may be treated at an enhanced rate because $D_B$ is good in linearity near (¼) P. Namely, if the weighted mean is carried out using the following formula, $$D_S = (W_A' \times D_A' + W_B \times D_B)/W_A' + W_B)$$

where the weight constants for $D_A'$, $D_B$ are $W_A'$, $W_B$ respectively, in accordance with the weighted mean value $D_S$, a fine count property having a good linearity as shown in the lower stage of FIG. 6 will be obtained. For example, one case of the weight constants $W_A'$, $W_B$ is shown in the mid stage of FIG. 6. When X=OP, (½) P, $D_S = D_A'$ due to $W_A' = 1.0$, $W_B = 0$, and when X=(¼) P, $D_S = D_B$ due to $W_A' = 0$, $W_B = 1.0$. This shows that the duty ratio having a phase which is positioned in an area having a good linearity is given priority. FIG. 6 shows in its upper stage which will take priority over the others.

Now, let's return to FIG. 5. A program which is supplied to CPU by a microcomputer is shown, wherein at $P_1$, the duty ratio $D_A$ of an A phased signal is converted to a B phased level, so a resultant duty ratio $D_A'$ is obtained by amending the phase difference. If the phase difference is 90 degrees, the difference is corresponding to a duty ratio of 0.5, which is expressed the following formulas.

$$D_A' = D_A + 0.5 \text{(when } D_B \geq 0.5)$$

$$D_A' = D_A - 0.5 \text{(when } D_B < 0.5)$$

At $P_2$, the existent stroke position X is deduced from a duty ratio $D_A'$ resulting from the conversion of the duty ratio $D_B$ of the B phased signal to A phases signal. In the deduction of stroke position, either $D_B$ or $D_A'$ may be given priority even when they are subjected to simple averaging process.

At $P_3$ are calculated weight constants $W_A'$, $W_B$ with respect to the duty ratio obtained from the respective phase signals in response to the deduced stroke position. For example, the properties of $W_A'$, $W_B$ as shown in the middle stage of FIG. 6, as tabulated is memorized in ROM of the microcomputer in such a manner that the memorized data can be read out in accordance with said deduced stroke position. It goes without staying that if a intersection point for the bath $W_A'$, $W_B$ is intended to appear at the priority switching point (corresponding to the positions of X=(¼) P and (¾) P), any transition may be made, and the weight constants $W_A'$, $W_B$ may be set not only linearly as in the middle of FIG. 6, but also in a manner of curved lines of high degree.

Finally, at $P_4$, the weighted mean value is found by $D_S = (W_A' \times D_A + W_B \times D_B)/(W_A' + W_B)$ in order to provide a fine position $D_S$.

Figure 7A:
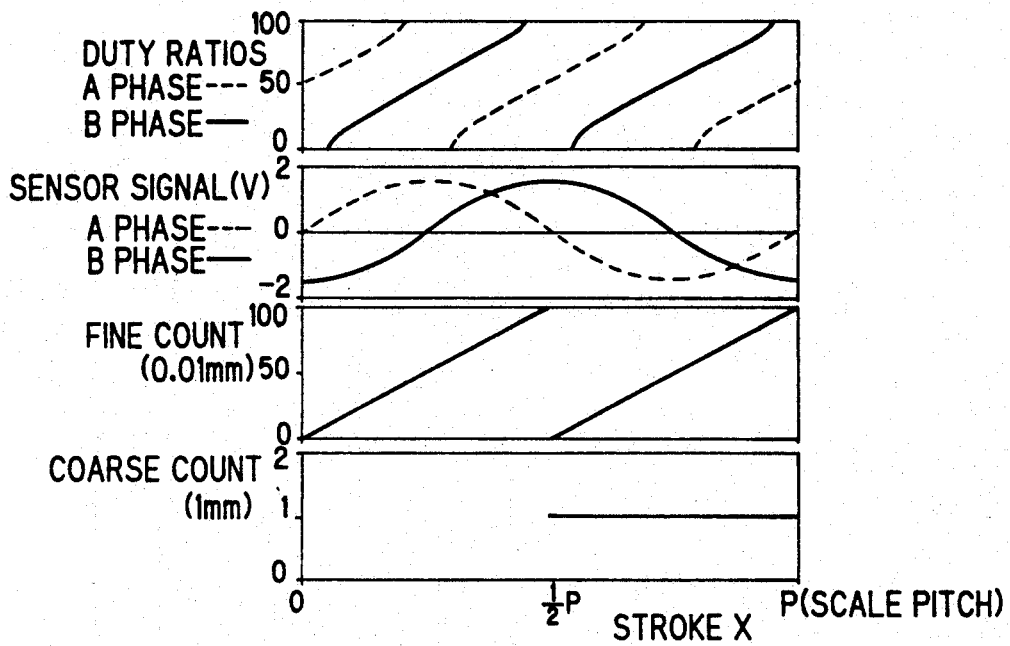
Figure 7B:
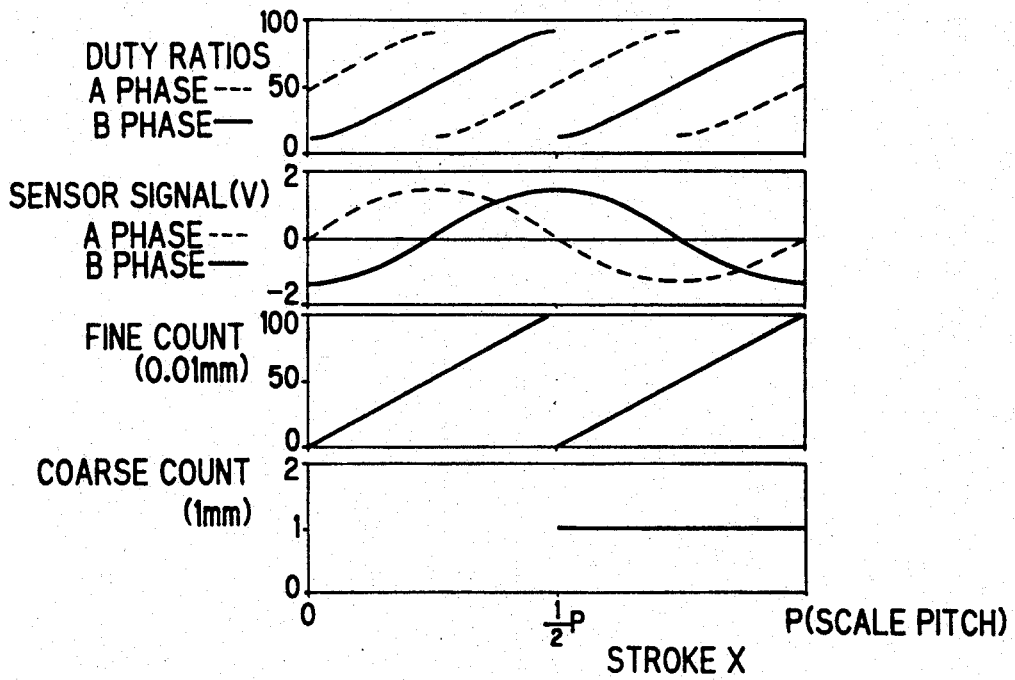

The experimental result in accordance with this embodiment is illustrated in FIGS. 7 (A), (B). It is apparent from the result that if the sensor signal and the modulating signal are inconsistent with each other in the amplitude, the linearity of the duty ratio is in disorder in the neighborhood of the peak value of the sensor signal as shown by FIGS. 7 (A), (B) in the upper stages, but in accordance with the fine count obtained through the arithmetic processing as shown in FIG. 5, the linearity is improved with respect to the stroke X as shown in the third stage counting from the top of the each top of FIGS. 7 (A), (B).

Although both phases are pulse-width modulated, there may occur discontinuity in the fine count at the selection switching point or variation in the inclination of the fine count with respect to the stroke X, but in this example, neither discontinuity in the fine count nor constant inclination of the fine count straight line is seen as shown in the third stage from the top of each of FIGS. 7 (A), (B).

Although not shown, it should be noted that such a result is equally obtainable in the case where the sensor signal is variable for each scale pitch.

In other words, the present invention relates to a processing system where position signals can be obtained by pulse-width modulating both sensor signals, and giving priority to (not simply selecting) a signal with a phase having a good linearity of the duty ratio.

In the example of FIGS. 7 (A), (B), the scale pitch is 2 mm, and the coarse position ((½) P) is divided into 100 segments, therefor the distance between the coarse positioning scale markings is 1.00 mm and the distance between the fine positioning scale markings is 0.01 mm.

It is to be understood that the present invention is applicable to any, other type of processing systems without extending beyond the spirit and essential characteristic features, and thus the preferred embodiments described in this specification are only examples, but not limiting ones.

What is claimed is:

1. A system for processing position signals corresponding to movement of an object, the movement being defined by increments of movement of predetermined length, comprising first and second magnetic sensors for producing first and second signals having amplitudes that vary sinusoidally with said movement at a pitch corresponding to said predetermined length, the first and second signals corresponding to positions of said object that are spaced from one another by a quarter of said predetermined distance means for pulse-width modulating said first and second signals with high frequency sinusoidal modulating waves as modulating signals to produce a first pair of pulse-width modulated signals, a phase switching means connected to receive said first pair of pulse-width modulated signals and produce a corresponding second pair of pulse-width modulated signals that are in phase with one another, means for calculating weight constants for the signals of the second pair of pulse-width modulated signals for assigning the signal of said second pair of pulse-width modulated signals having a higher linearity a greater weight than the other signal of said second pair of signals by weighting said signals of said second pair of pulse-width modulated signals in dependence on said weight constants.

2. A system for processing position signals as defined in claim 1, comprising means for dividing one cycle of said first magnetic sensor signal into four quarter cycle sections to derive first, second, third and fourth quarter cycle signals, respectively, means for inverting said second quarter cycle signal means for selecting said inverted second quarter cycle signal and the first quarter cycle signal of the four quarter cycle sections, means for dividing one cycle of said second magnetic sensor signal into two half cycle sections having first and second half cycle signals, means for selecting the first half cycle signal and means for pulse-width modulating said first magnetic sensor signals and the selected signal of said second magnetic sensor by the high frequency sinusoidal signals.

3. A system for processing position signals as defined in claim 2, wherein said phase switching means comprises means for bringing the first of the two half cycle signals of said magnetic sensor and the pulsewidth modulated signal in phase with one another by shifting down the pulse-width modulated first quarter cycle signal of said first magnetic sensor by a duty ratio of 0.5, and shifting up the pulse-width modulated second inverted quarter cycle signal by a duty ratio of 0.5.

4. A system for processing position signals as defined in claim 1 wherein said means for calculating weight constants comprises means for enhancing the first half cycle signal of said second magnetic sensor in the vicinity of a quarter pitch of said pitch, and means for enhancing the pulse-width modulated signal of said first magnetic sensor in the vicinity of a zero pitch and a half pitch of said pitch.

* * * * *